United States Patent
Gillham et al.

(10) Patent No.: US 6,295,398 B1
(45) Date of Patent: Sep. 25, 2001

(54) ASYMMETRICAL MINIATURE BENDS IN OPTICAL FIBERS AND METHOD OF FORMING SAME

(75) Inventors: Frederick J. Gillham, Westborough; Thomas R. Ouellette; David W. Stowe, both of Milford, all of MA (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/382,072

(22) Filed: Aug. 24, 1999

Related U.S. Application Data

(60) Provisional application No. 60/097,822, filed on Aug. 25, 1998, and provisional application No. 60/097,773, filed on Aug. 25, 1998.

(51) Int. Cl.⁷ .................................................. G02B 6/32
(52) U.S. Cl. ................................ 385/32; 385/42; 385/43; 385/16
(58) Field of Search .................................. 385/13, 15, 16, 385/32, 42, 43, 45; 250/227.16, 227.14

(56) References Cited

U.S. PATENT DOCUMENTS

| | | | |
|---|---|---|---|
| 4,812,001 | * 3/1989 | Tomita et al. | 385/32 |
| 4,911,510 | * 3/1990 | Jenkins | 385/32 |
| 5,138,676 | 8/1992 | Stowe et al. . | |
| 5,222,165 | * 6/1993 | Bohlinger | 385/32 |
| 5,353,363 | * 10/1994 | Keck et al. | 385/46 |
| 5,452,393 | 9/1995 | Stowe et al. . | |
| 5,517,590 | * 5/1996 | Auborn et al. | 385/32 |
| 5,553,179 | * 9/1996 | Cryan et al. | 385/43 |
| 5,633,494 | * 5/1997 | Danisch | 385/13 |

* cited by examiner

Primary Examiner—Frank G. Font
Assistant Examiner—Sang H. Nguyen
(74) Attorney, Agent, or Firm—Weingarten, Schurgin, Gagnebin & Hayes LLP

(57) ABSTRACT

A fiber optic device for changing direction along a fiber optic path is provided using an asymmetrical miniature bend. The fiber optic device with the miniature bend is particularly suitable for components in which one of the fiber portions lies close to a surface, such as a single sided splitter. A method of forming such an asymmetrical miniature bend in optical fibers is also provided. In one embodiment to form the asymmetrical bend, entering and exiting fiber portions are offset along parallel axes prior to bending an intermediate portion. In another embodiment, the intermediate portion is heated at a location that is offset from a bending axis.

16 Claims, 5 Drawing Sheets

ASYMMETRICAL MINIATURE BENDS IN OPTICAL FIBERS AND METHOD OF FORMING SAME

CROSS REFERENCE TO RELATED APPLICATIONS

This application claims the benefit under 35 UL.S.C. §119(e) of U.S. Provisional Application No. 60/097,822, filed on Aug. 25, 1998, and No. 60/097,773, filed on Aug. 25, 1998, the disclosures of both of which are incorporated by reference herein.

This application is related to a commonly assigned application by the same inventors entitled "Single-Sided Fiber Optic Splitter With Integral Miniature Bend", Application Ser. No. 09/379,932, filed concurrently herewith on Aug. 24, 1999, the disclosure of which is incorporated by reference herein.

STATEMENT REGARDING FEDERALLY SPONSORED RESEARCH OR DEVELOPMENT

N/A

BACKGROUND OF THE INVENTION

In certain fiber optical components and applications using small packages, it is necessary to form a miniature bend in the bare fiber to change the direction of the fiber. To avoid light loss and maintain a useful longevity in an unprocessed bent fiber, the turn typically requires a bend radius of 2 cm or more. This radius may be substantially reduced to as little as 50$\mu$ using a miniature bend. To form a miniature bend, the diameter along a length of bare fiber is reduced to as little as 1 $\mu$ or less, by, for example, drawing, etching, or a combination thereof. In the reduced diameter region, the fiber conducts light by internal reflection at least partially due to the difference in index of refraction at the interface between the fiber and the surrounding environment, generally air. Thus, in this region, the fiber may be bent with no substantial light loss from the bend. See U.S. Pat. Nos. 5,138,676 and 5,452,383, the disclosures of which are incorporated by reference herein.

In such miniature bends, it is desirable in some applications to keep the radius of curvature in the bend region to a value of 0.5 mm or larger to avoid loss of optical energy in the bend region. Because the bend is symmetrical, the bend region of the fiber protrudes above the plane of the fiber, as can be seen in FIG. 1. If the fiber lies close to a surface, the bend may potentially contact the surface. Generally, contact of the fiber in the bend region with any surface also causes light loss, which is undesirable. Therefore, the input fibers to a symmetric miniature bend must be spaced a sufficient distance from such a surface to prevent contact between the surface and the bare fiber of the bend. Alternatively, the surface must be formed with a deviation to avoid contact with the bend.

BRIEF SUMMARY OF THE INVENTION

The present invention provides a fiber optic device for changing direction along a fiber optic path using an asymmetrical miniature bend. The device comprises an optical fiber having an entering fiber portion and an exiting fiber portion. A buffer covers at least a portion of the entering fiber portion and the exiting fiber portion. A bend is formed in an intermediate portion comprising a bared optical fiber portion between the entering fiber portion and the exiting fiber portion of the optical fiber. The intermediate portion includes a region having a diameter reduced to less than a diameter of a fiber portion unreduced in diameter and is capable of transmitting light with substantially less light loss due to bending than the unreduced fiber portion. The bend provides a change of direction between the entering fiber portion and the exiting fiber portion and has an asymmetrical configuration formed by an outwardly convex portion and an outwardly concave portion. To provide a reversal of direction of the fiber optic path, the outwardly convex portion extends over an angle greater than 180°. Both the convex portion and the concave portion have a radius of curvature sufficiently large to minimize loss of optical energy in the bend. The radius of curvature is preferably at least approximately 0.5 mm. Those of skill in the art will appreciate that the minimization of loss of optical energy refers to avoiding as much light loss as practical using miniature bend technology such as described in U.S. Pat. Nos. 5,138,676 and 5,452,383.

The present invention also provides a method of forming such an asymmetrical miniature bend in optical fibers. In one embodiment, the entering and exiting fiber portions are offset along parallel axes prior to bending the intermediate portion, resulting in an asymmetrical bend. In another embodiment, the intermediate portion is heated at a location that is offset from the bending axis, also resulting in an asymmetrical bend.

The fiber optic device with an asymmetric miniature bend is particularly suitable for components in which one of the fiber portions lies close to a surface, such as a single sided splitter or coupler.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
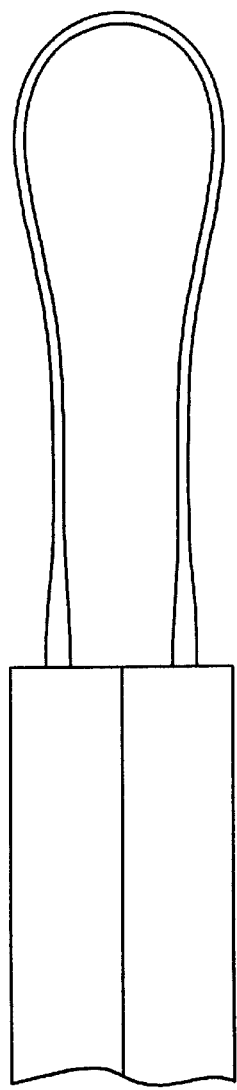
FIG. 1 illustrates a prior art symmetric miniature fiber optic bend.
Figure 2:
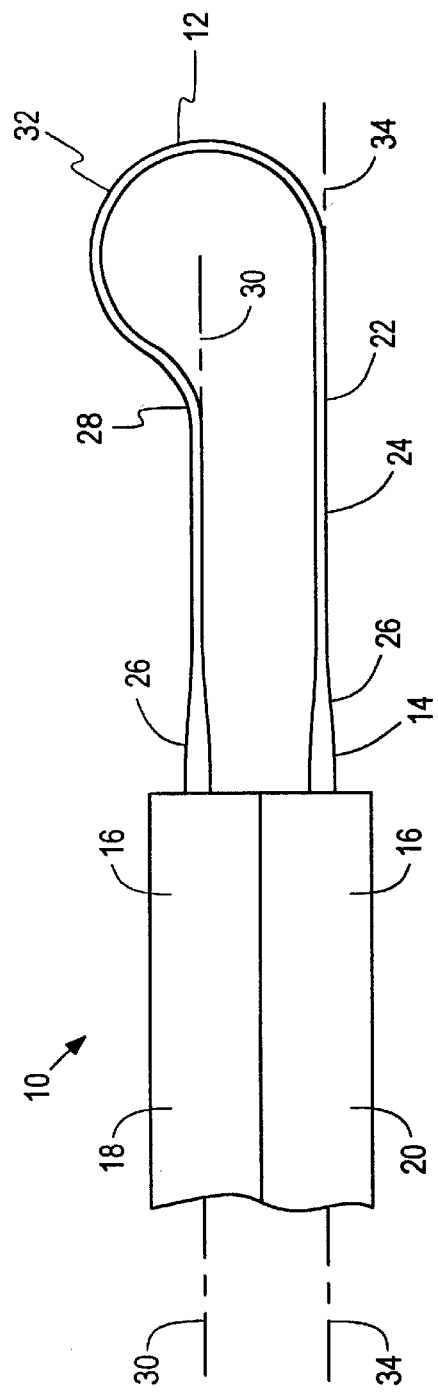
FIG. 2 illustrates an asymmetric miniature bend in an optical fiber according to the present invention.

A fiber optic device 10 for changing direction along a fiber optic path using an asymmetric bend 12 according to the present invention is illustrated in FIG. 2. The device is formed with an optical fiber 14 protected with a polymer buffer or jacket 16. The fiber includes an entering fiber portion 18 and an exiting fiber portion 20. The buffer is removed from an intermediate portion 22 between the entering and exiting fiber portions. The asymmetric bend 12 is formed in the intermediate fiber portion.

More particularly, the diameter of the intermediate portion is reduced in a central region 24 to an appropriate diameter to achieve a miniature bend with minimum light loss, as known in the art. Preferably, a straight tapered transition region 26 is left on each side between the central reduced diameter region 24 and the entering and exiting fiber portions 18, 20. The bend 12 is formed in the reduced diameter region 24. The bend includes an outwardly concave portion 28 that diverges away from the axis 30 of the entering fiber portion 18. The bend further includes an outwardly convex portion 32 that extends from the concave portion 28 to the axis 34 of the exiting fiber portion 20. The radii of curvature of both the concave and convex portions 28, 32 are sufficiently large, approximately 0.5 mm, that no significant optical loss occurs in the bend 12. In this manner, the bend is able to retain the low excess loss characteristic and the low polarization sensitivity of symmetrical miniature bends. Because of the asymmetry of the bend, it is possible to have the bend 12 lie in any position or relation to the buffered fiber portions 18, 20. It will also be appreciated that the entering and exiting fiber portions may be reversed, such that the outwardly concave portion diverges away from the axis of the exiting portion and the outwardly convex portion extends from the concave portion to the entering portion.

In the embodiment illustrated, the direction of the fiber is reversed. That is, the fiber is folded back upon itself in a substantially 180° bend, so that the entering and exiting fiber portions are parallel or substantially parallel and extend adjacent or close to each other along parallel or substantially parallel axes. In this case, the convex portion 32 extends over an angle greater than 180°. Other bend angles may be provided, however, if desired.

Figure 3:
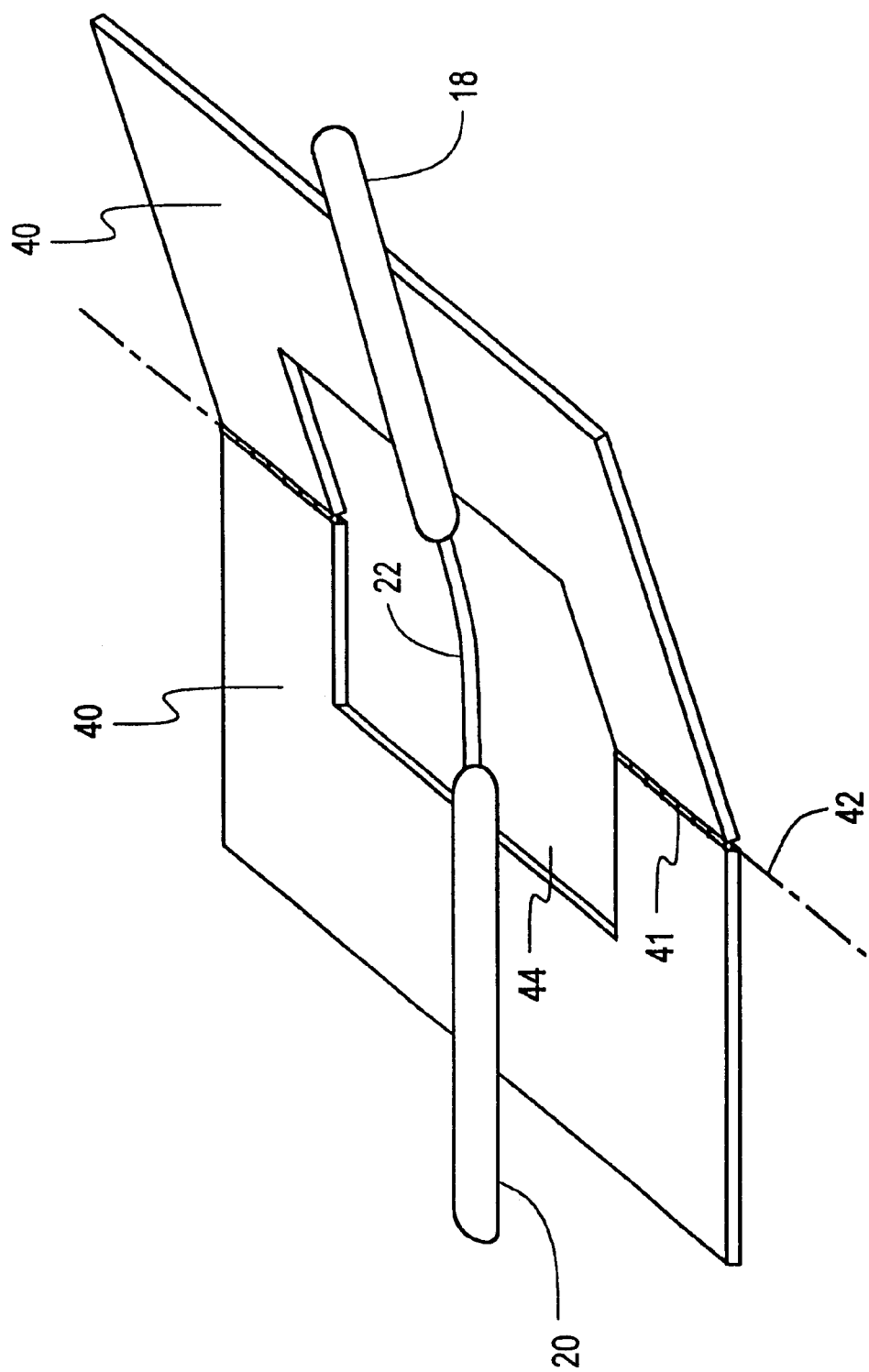
FIG. 3 illustrates a method of forming the asymmetric miniature bend according to the present invention.

To form the asymmetrical bend 12, the buffer 16 is removed from the intermediate portion 22 where the bend is desired to be located. The diameter of the intermediate portion is reduced in the central region 24, for example, by drawing, etching, or a combination thereof, to an appropriate diameter to achieve a miniature bend with minimum light loss, as known in the art. The intermediate portion is bent, discussed more fully below, with the use of a suitable support. The support comprises hinged plates 40 illustrated in FIG. 3. The hinge 41 between the plates 40 defines an axis 42 about which the central region 24 of the fiber is bent. An opening 44 is provided in and between the plates 40 to allow the central region to be heated with a suitable heat source, such as a flame 46, if desired to soften the fiber and ease the bending.

Figure 4:
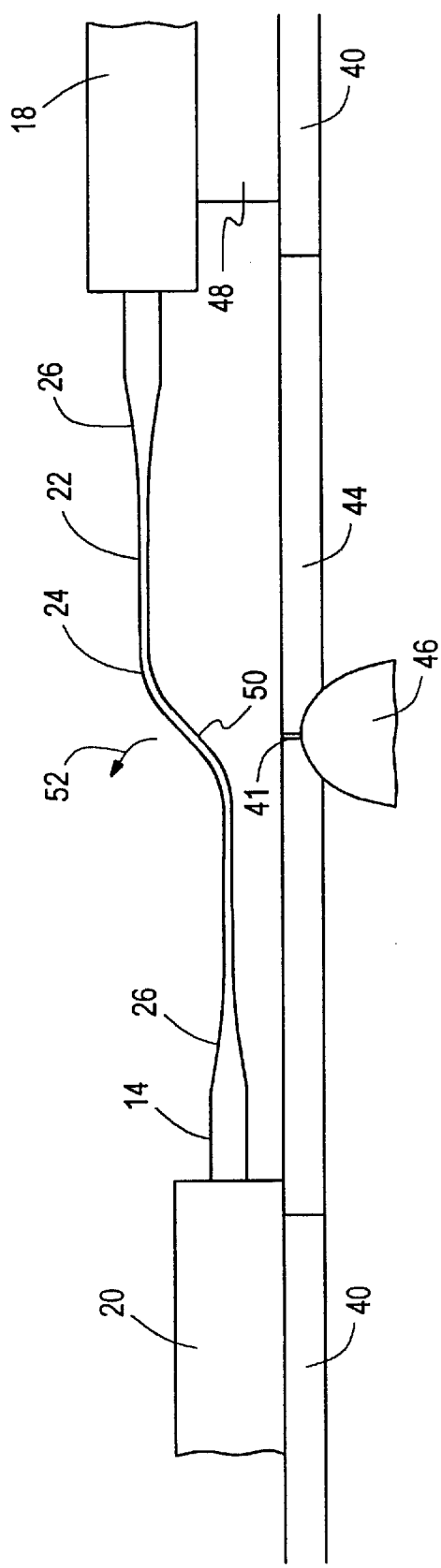
FIG. 4 illustrates a first embodiment in forming the asymmetric miniature bend according to the present invention.

In one embodiment of the present method, illustrated in FIG. 4, the asymmetrical bend is formed by misaligning or offsetting the entering and exiting fiber portions 18, 20 during the bending by, for example, a raised support block 48 on one of the hinged plates. The fibers may be misaligned or offset either prior to the application of heat or during the application of heat. A small bend 50 develops from the misalignment. When the central region 24 to be bent reaches a sufficient temperature to soften the fiber, the fiber is bent in the direction of arrow 52 by pivoting the hinged plates 40 about the bending axis 42. The resulting bend is asymmetrical.

Figure 5:
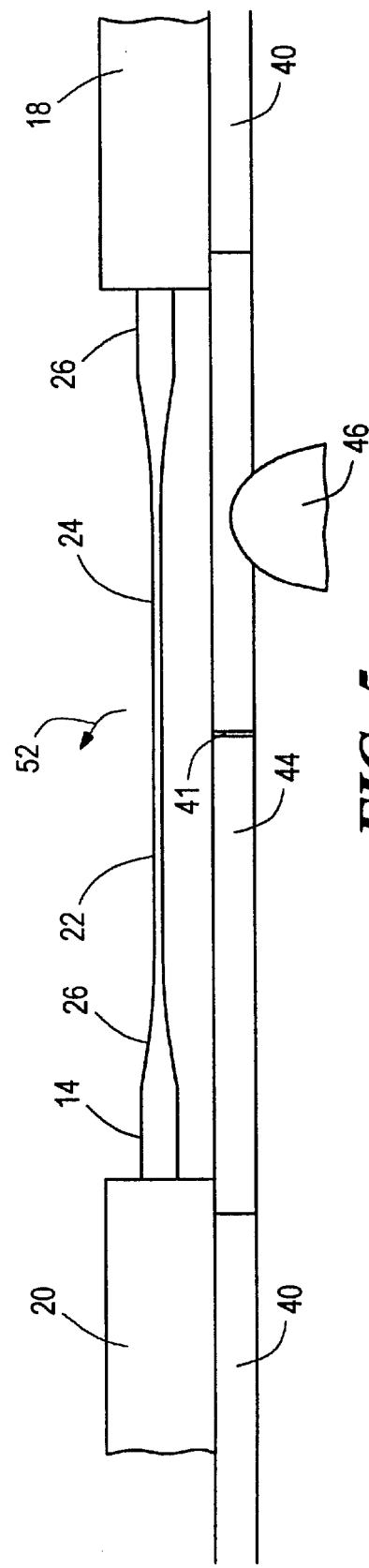
FIG. 5 illustrates a further embodiment in forming the asymmetric miniature bend according to the present invention.
Figure 6:
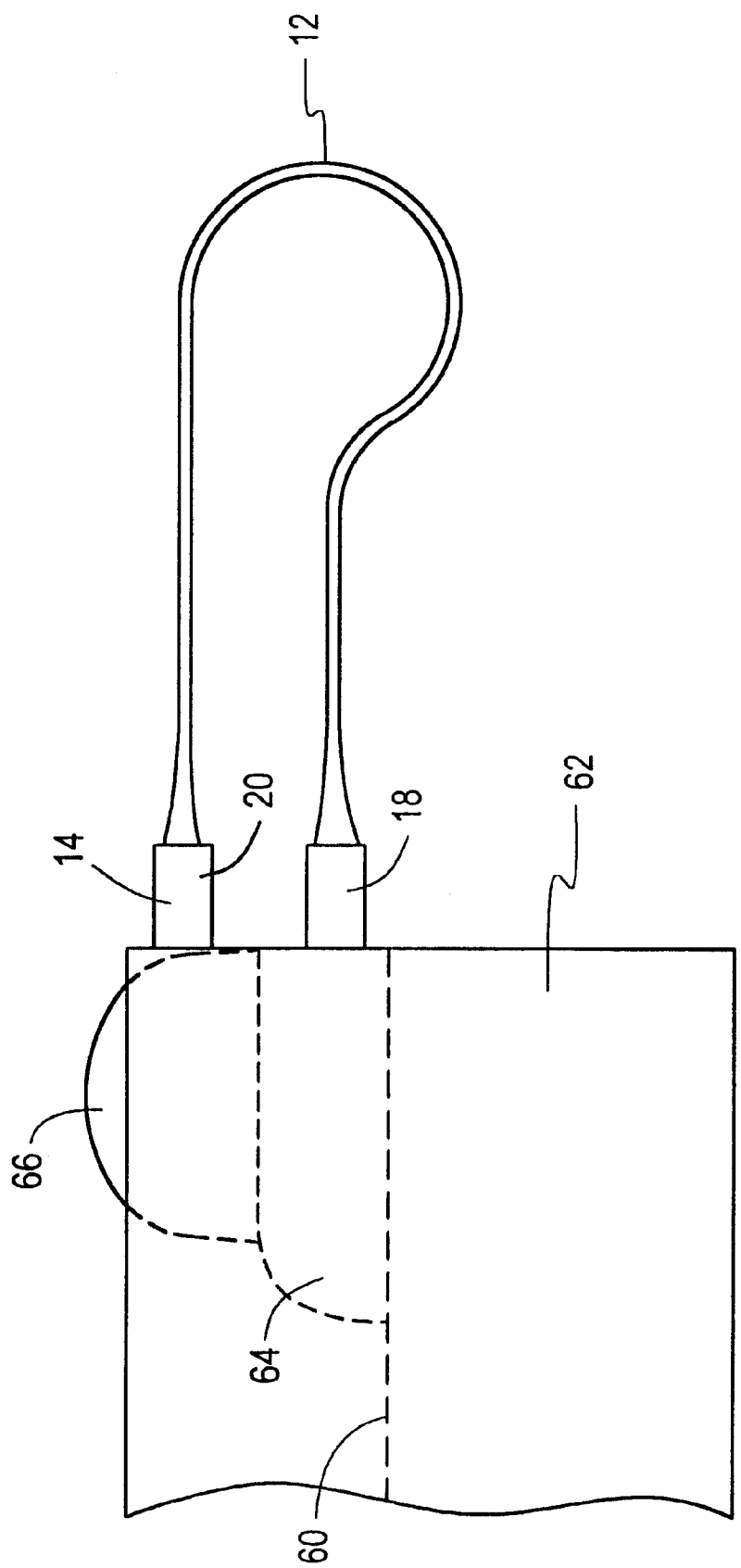
FIG. 6 is a partial side view of a single sided splitter or coupler incorporating the asymmetric miniature bend of the present invention.
Figure 7:
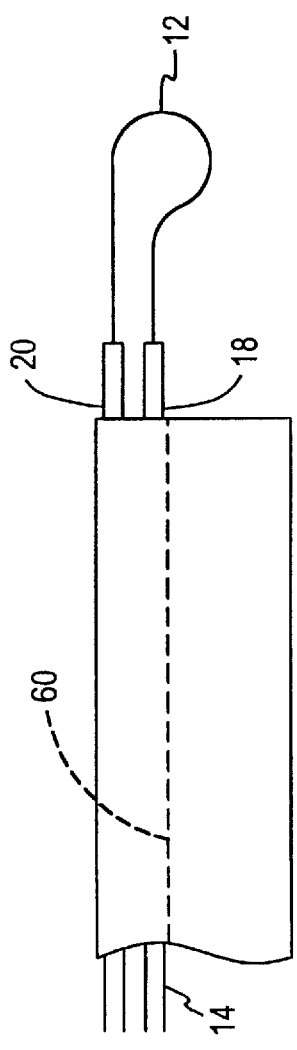
FIG. 7 is a side view of the single-sided splitter or coupler of FIG. 6.
Figure 8:
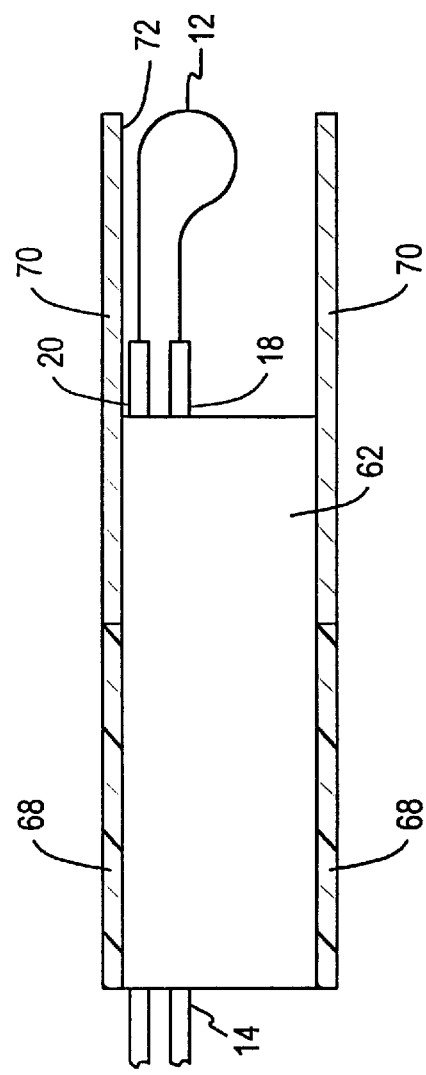
FIG. 8 is a partial cross-sectional view of a single-sided splitter or coupler package.
Figure 9:
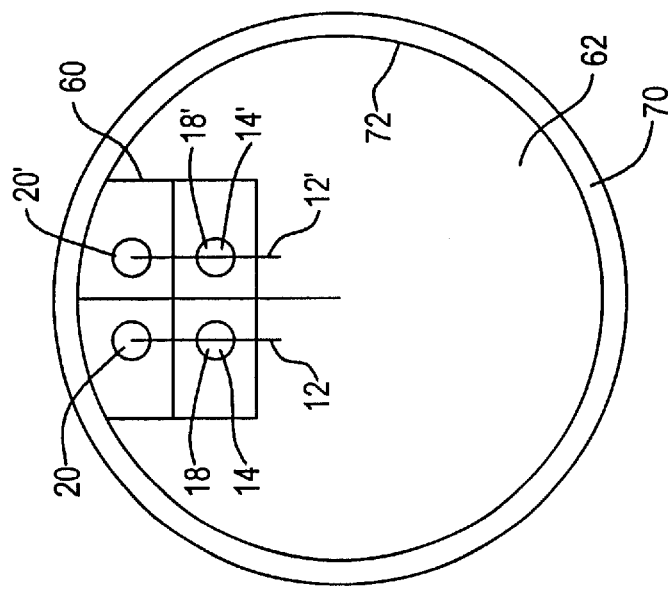
FIG. 9 is an end view of the package of FIG. 8.

In an alternative embodiment, illustrated in FIG. 5, the asymmetrical bend is formed by offsetting the heat source 46 from the bending axis 42. When the central region 24 to be bent reaches a sufficient temperature to soften the fiber, the fiber is bent in the direction of arrow 52 by pivoting the hinged plates 40 about the bending axis 42. The resulting bend is asymmetrical.

In other variations, the fiber in the region of the bend may be etched prior to heating or may be etched after heating, as known in the art, if desired. The fiber may also be thermally tapered prior to bending to provide tapered portions where the bare fiber portion exits the buffered portions, also as known in the art, if desired. The sequence of etching, tapering, and bending may be varied to find the most effective process for the particular fiber being used and for the desired optical performance characteristics of the particular fiber and application.

The asymmetrical bend is particularly useful in a single sided splitter or coupler, in which the inherent geometry favors an asymmetrical bend, as illustrated in FIGS. 6–9. In this component, a channel 60 is formed in a substrate 62 to receive two fibers 14, 14', each with a miniature bend 12, 12'. The entering fiber portions 18, 18' are retained within the channel 60 by a suitable adhesive 64, as known in the art. Bared fiber portions of the entering fiber portions within the substrate are fused to form the splitter or coupler, as known in the art. The exiting fiber portions 20, 20' are retained in the channel 60 above the entering fiber portions 18, 18', also with a suitable adhesive 66, as known in the art. The bends 12, 12' extend outside the end of the substrate 62. A protective polymer tube 68 is provided over the substrate to provide protection from airborne contaminants during further packaging. See FIG. 9.

A rigid protective shield 70 is placed over the end of the substrate from which the miniature bends 12, 12' extend, to protect the bends from contact with other surfaces, which would degrade the optical performance of the fibers. This shield may be formed of any material, for example, stainless steel, that is sufficiently rigid to resist collapse against the bend. The shield may be fixed to the substrate in any suitable manner, such as with glue or epoxy. The bends 12, 12' are located so that one of the entering and exiting portions lies along or close to the inner surface 72 of the shield, yet the bends 12, 12' themselves are directed away from the surface, so that the bends do not contact the surface, thereby obviating light loss due to such contact. Thus, using the asymmetrical bend, the channel depth may be minimized within the substrate, thereby maximizing substrate material and substrate strength. Also, the asymmetrical miniature bend provides a more compact structure. It is apparent that, if a conventional symmetric miniature bend were used, one side of the miniature bend would likely contact the interior wall of the shield, requiring either a deeper substrate channel or a deviation in the shield in the vicinity of the bend.

The asymmetrical bend of the present invention also allows for a single sided splitter or other component that is less sensitive to vibration and mechanical impact of the component. Upon impact or vibration of the component, the miniature bend also accelerates or vibrates, and the motion of the bend may be timed differently from that of the exterior housing. Thus, the additional wall clearance allowed by the asymmetrical bend gives greater tolerance for vibrational and impact excursions of the miniature bend relative to the housing wall. Therefore, a fiber optic component with the asymmetrical bend is more robust against mechanical effects.

The invention is not to be limited by what has been particularly shown and described, except as indicated by the appended claims.

We claim:

1. A fiber optic device for changing direction along a fiber optic path, comprising:
   an optical fiber having an entering fiber portion and an exiting fiber portion, a buffer covering at least a portion of the entering fiber portion and the exiting fiber portion; and
   a bend formed in an intermediate portion comprising an optical fiber portion between the entering fiber portion and the exiting fiber portion of the optical fiber, the intermediate portion including a region having a diameter reduced to less than a diameter of the entering fiber portion and the exiting fiber portion and capable of transmitting light with substantially less light loss due to bending than an unreduced fiber portion, the bend providing a change of direction between the entering fiber portion and the exiting fiber portion and having an asymmetrical configuration formed by an outwardly convex portion and an outwardly concave portion.

2. The fiber optic device of claim 1, wherein one of the entering fiber portion and the exiting fiber portion lies along a first axis, the other of the entering fiber portion and the exiting fiber portion lies along a second axis, and the convex portion bends away from the first axis in a direction toward the second axis.

3. The fiber optic device of claim 1, wherein the outwardly convex portion is bent greater than 180°.

4. The fiber optic device of claim 1, wherein the bend provides a reversal of direction between the entering fiber portion and the exiting fiber portion.

5. The fiber optic device of claim 1, wherein the convex portion and the concave portion each have a radius of curvature sufficiently large to minimize loss of optical energy in the bend.

6. The fiber optic device of claim 1, wherein the radius of curvature is at least approximately 0.5 mm.

7. The fiber optic device of claim 1, further comprising a buffer covering the entering fiber portion and the exiting fiber portion.

8. The fiber optic device of claim 1, wherein the diameter of the intermediate portion is reduced by etching, drawing, or a combination of etching and drawing.

9. The fiber optic device of claim 1, further comprising a housing assembly including a surface, the entering fiber portion and the exiting fiber portion fixedly mounted to the housing assembly with one of the entering fiber portion and the exiting fiber portion lying along the surface, the bend oriented with respect to the housing to bend away from the surface.

10. The fiber optic device of claim 1, wherein the intermediate fiber portion comprises a bared optical fiber portion.

11. An optical component including a fiber optic device for changing direction along a fiber optic path, comprising:
    an optical fiber having an entering fiber portion and an exiting fiber portion, a buffer covering at least a portion of the entering fiber portion and the exiting fiber portion; and
    a bend formed in an intermediate portion comprising an optical fiber portion between the entering fiber portion and the exiting fiber portion of the optical fiber, the intermediate portion including a region having a diameter reduced to less than a diameter of the entering fiber portion and the exiting fiber portion and capable of transmitting light with substantially less light loss due to bending than an unreduced fiber portion, the bend providing a change of direction between the entering fiber portion and the exiting fiber portion and having an asymmetrical configuration formed by an outwardly convex portion and an outwardly concave portion.

12. A fiber optic single sided splitter or coupler including a fiber optic device for changing direction along a fiber optic path, comprising:
    an optical fiber having an entering fiber portion and an exiting fiber portion, a buffer covering at least a portion of the entering fiber portion and the exiting fiber portion; and
    a bend formed in an intermediate portion comprising an optical fiber portion between the entering fiber portion and the exiting fiber portion of the optical fiber, the intermediate portion including a region having a diameter reduced to less than a diameter of the entering fiber portion and the exiting fiber portion and capable of transmitting light with substantially less light loss due to bending than an unreduced fiber portion, the bend providing a change of direction between the entering fiber portion and the exiting fiber portion and having an asymmetrical configuration formed by an outwardly convex portion and an outwardly concave portion.

13. A method of forming a fiber optic device having a change of direction along a fiber optic path, comprising:
    providing an optical fiber having an entering fiber portion and a exiting fiber portion and an intermediate portion integral with and between the entering fiber portion and the exiting fiber portion;
    reducing the diameter of the intermediate portion to a diameter less than a diameter of the entering fiber portion and the exiting fiber portion and capable of transmitting light with substantially less light loss due to bending than the entering fiber portion or the exiting fiber portion; and
    bending the intermediate portion forming an asymmetrical configuration by an outwardly convex portion and an outwardly concave portion.

14. The method of claim 13, further comprising, prior to the step of bending the intermediate portion, the entering and exiting fiber portions are maintained along parallel, offset axes.

15. The method of claim 14, further comprising:
    heating the intermediate portion at a midpoint between the entering fiber portion and the exiting fiber portion; and
    bending the intermediate portion about an axis located at the midpoint.

16. The method of claim 13, wherein the bending step further comprises:
    heating the intermediate portion at a first location; and
    bending the intermediate portion about an axis at a second location offset from the first location.

* * * * *